(12) United States Patent
van Bavel

(10) Patent No.: US 9,728,224 B2
(45) Date of Patent: Aug. 8, 2017

(54) VIDEO EDITING SYSTEM USER INTERFACE USING VIRTUAL FILM EQUIPMENT

(71) Applicant: Marcus van Bavel, Austin, TX (US)

(72) Inventor: Marcus van Bavel, Austin, TX (US)

( * ) Notice: Subject to any disclaimer, the term of this patent is extended or adjusted under 35 U.S.C. 154(b) by 544 days.

(21) Appl. No.: 14/149,143

(22) Filed: Jan. 7, 2014

(65) Prior Publication Data

US 2015/0194184 A1   Jul. 9, 2015

(51) Int. Cl.
| | |
|---|---|
| *G06F 3/048* | (2013.01) |
| *G11B 27/02* | (2006.01) |
| *G06F 3/0488* | (2013.01) |
| *G06F 3/0484* | (2013.01) |
| *G06F 3/01* | (2006.01) |
| *G06F 3/0481* | (2013.01) |
| *G06F 3/0482* | (2013.01) |

(52) U.S. Cl.
CPC ............. *G11B 27/02* (2013.01); *G06F 3/011* (2013.01); *G06F 3/0482* (2013.01); *G06F 3/0488* (2013.01); *G06F 3/04815* (2013.01); *G06F 3/04842* (2013.01)

(58) Field of Classification Search
CPC ............ G06F 3/04842; G06F 4/0488; G06F 3/04815; G11B 27/02
See application file for complete search history.

(56) References Cited

U.S. PATENT DOCUMENTS

| | | | | |
|---|---|---|---|---|
| 5,880,722 A * | 3/1999 | Brewer | ............... | G06F 3/04847 715/723 |
| 5,930,797 A * | 7/1999 | Hill | .................... | G06F 17/30017 |
| 5,966,310 A * | 10/1999 | Maeda | .................... | G06T 17/00 |
| 6,154,600 A * | 11/2000 | Newman | ............... | G06F 3/0213 348/552 |
| 6,317,141 B1 * | 11/2001 | Pavley | ................. | G11B 27/034 715/723 |
| 7,565,058 B2 * | 7/2009 | Kihara | ................. | G11B 27/034 386/280 |
| 7,956,847 B2 * | 6/2011 | Christie | .................. | G06F 3/044 345/173 |
| 2012/0084689 A1 * | 4/2012 | Ledet | .................... | G06F 3/0486 715/769 |
| 2013/0132875 A1 * | 5/2013 | Allen | .................. | G06F 3/04842 715/765 |

* cited by examiner

*Primary Examiner* — William Bashore
*Assistant Examiner* — Gregory A Distefano

(57) ABSTRACT

A video editing system comprising a computer or mobile device with a display screen, executing a software program whereby virtual film editing equipment is projected on the screen and used to edit motion video and audio programs as if they were physical strips of film or magnetic tape. The user of the system uses a fingertip, mouse, or spoken commands to control the virtual film editing equipment in much the same manner as mechanical film equipment is used to edit film and magnetic tape. A virtual camera on the screen is used to select video or audio clips to edit. A virtual film viewer is used to cut the virtual film clips. A virtual film reel is used to represent the assembled clips organized into a hierarchical structure. A virtual film projector is used to present choices to the user for the export of the reels for presentation to an audience.

10 Claims, 6 Drawing Sheets

VIDEO EDITING SYSTEM USER INTERFACE USING VIRTUAL FILM EQUIPMENT

CROSS-REFERENCE TO RELATED APPLICATIONS

This patent is a continuation of Provisional Patent Application 61/750,066, Filed Jan. 8, 2013, by Marcus van Bavel of Austin, Tex., titled "Video Editing System User Interface Using Virtual Film Equipment" and is incorporated by reference herein.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is related generally to systems for editing motion video and audio. More particularly, the present invention is related to computer-assisted motion video and audio editing systems, wherein motion video is stored as a sequence of digital still images and audio as a sequence of digital audio samples, in data files on a computer system or mobile device. The present invention is also related to systems for animated three-dimensional graphics projected onto a two-dimensional screen, and to systems with voice recognition.

Computer systems with motion video editing tools have been used to produce films, television shows, news broadcasts, commercials, sports programs, online video and home movies Like word-processing tools, such tools for editing video are now also commonplace in home computer systems and simple tools for trimming video clips are now in mobile devices. A computer-based video editing system is taught in U.S. Pat. No. 6,469,711 titled "Graphical User Interface for a Video Editing System" by Kevin J. Foreman et al. (2002). Also, for almost a century there have been chemical, mechanical and electro-mechanical devices that were used to shoot celluloid motion picture film, edit film, and combine film with magnetic audio tape to produce films for movie theater projection, television, and home video. These mechanical devices used intuitively obvious methods such as the forward/reverse switch, the hand crank, or the shelf of reels, to control the shooting, editing, organization, and projection of film. The film editing machine for example is taught in U.S. Pat. No. 1,921,469 "Film editing machine" by John J Kuhn, Roy V Terry (1930) and also in U.S. Pat. No. 3,856,389 "Horizontal film editing table" by Gardner R. (1974). However, the intuitive methods used for operating motion picture equipment have not translated into intuitive methods for editing motion video with a computer. Existing computer-based motion video editing tools are based upon the virtual desktop and mouse, derived from the original graphical desktop computers such as the Macintosh™ and the Windows™-based workstation. These methods are non-intuitive for video editing, and cannot be easily used with a touch screen or mobile device, or by spoken command, because the user interface is too complex and too cluttered.

Accordingly, the aim of the present invention is to use the power of animated 3D graphics, touch screens, and voice recognition to simulate a virtual world of film editing equipment, to make video editing intuitive and easy.

SUMMARY OF THE INVENTION

The present invention provides an interface to control the editing of a motion video program. Accordingly, in one embodiment of the invention, a top-level menu is presented to the user on a screen. Through the use of animated 3D graphics, the user sees three objects for the three essential steps of editing motion video, wherein the first, a motion picture camera, represents the selection of shots to be edited; the second, a film reel, represents the assembly of the selected shots; and the third, a film projector, represents the presentation of the edited video program. In another embodiment of the invention, the top-level menu is instead represented by a 3D animation of a video camera, an optical video disk, and a video projector. The video camera represents the selection of shots to be edited; the video disk represents the assembly of the selected shots; the video projector represents the presentation of the edited video program.

In another aspect of the invention, when the camera is touched or clicked by the user, or when the spoken command "camera" is uttered, the camera turns, enlarges, and reveals a plurality of file format containers for selection by the user. When the file format container is touched or clicked by the user or the name of the format is spoken, the format container turns, enlarges, and reveals a plurality of file folders for selection by the user. When the file folder is touched or clicked by the user, or the name of the folder is spoken, the folder turns, enlarges, and reveals a plurality of virtual film clips, represented by small view screens, for selection by the user. Each virtual film clip represents a motion video data file.

In another aspect of the invention, the virtual film clips are flicked by the user's finger into either a virtual film reel or a virtual film library. The direction of the motion of the user's finger indicates which destination is desired. Or, the virtual film clip is touched or clicked by the user, or the name of the clip is spoken, and the clip enlarges and becomes a virtual film clip viewing machine.

In another aspect of the invention, a virtual film clip viewing machine presents a plurality of virtual machine controls which the user can manipulate, either by clicking, dragging, or by using the finger, or by a spoken command, to accomplish one of a plurality of actions. For one control a play button may be clicked or touched to start playback, or dragged from its position to stretch out a virtual hand crank. The virtual hand crank controls two things: first, the angle of rotation of the hand crank advances or retards the frame shown in the screen of the virtual film viewer; second, by stretching the length of the hand crank, the number of frames that will be advanced or retarded per turn of the crank is changed.

In another aspect of the invention, the virtual film viewer is also used as a synchronizer, wherein multiple reels or clips, or soundtracks, can be loaded into the film viewer and viewed in synchronization. In this way the user can examine or adjust the relative timing of shots, particularly shots that are superimposed over one another, or shots in a multi-camera shoot, or a title superimposed over a sequence of shots.

In a further aspect of the invention, when the film reel in the top menu is touched or clicked, or the spoken command "reel" is uttered, the reel rotates and enlarges, revealing the clips inside the reel, represented by a pie chart. Each slice of the chart represents a clip in the scene or movie. Each slice of the chart may also contain a miniature reel, which represents either a sequence of clips nested within the larger reel, or a sequence of shots that are superimposed over the larger reel. Reels can be nested inside each other to create a hierarchical structure for complex projects.

In another aspect of the invention, when the film projector in the top menu is touched or clicked, or the spoken command "projector" is uttered, the projector turns, enlarges, and reveals a plurality of file format containers. By selecting one of the containers, the container turns, enlarges, and reveals a plurality of controls wherein the user selects the parameters for the conversion of the edited reel to the selected file format.

DETAILED DESCRIPTION OF THE INVENTION

The present invention will be more completely understood through the following detailed description which should be read in conjunction with the attached drawings in which similar reference numbers indicate similar structures.

Figure 1:
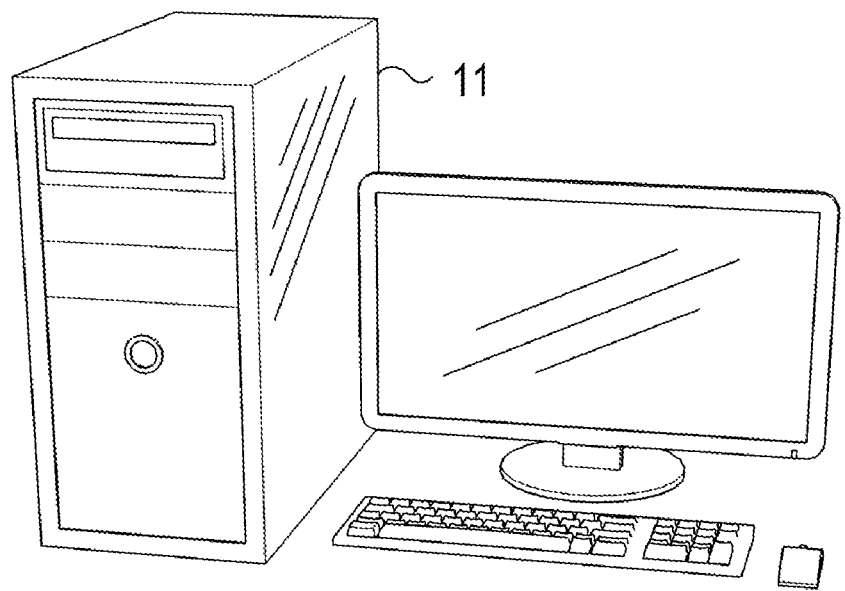
FIG. 1 shows three examples of computer systems in which the present invention may be implemented.
Figure 1:
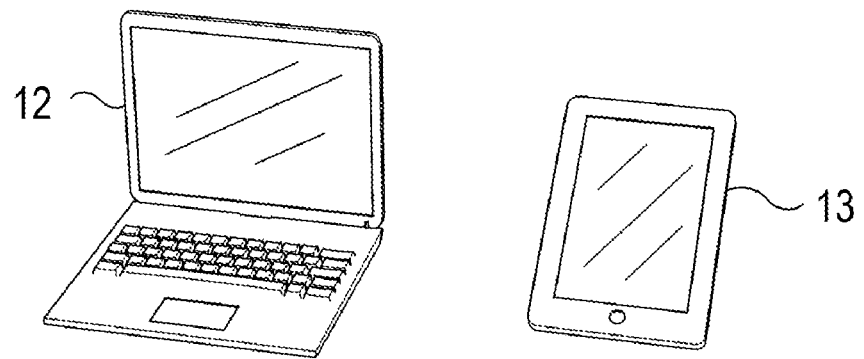

In FIG. 1, the invention may be implemented on any of three kinds of computer systems diagrammed, the desktop computer 11, laptop computer 12, or the mobile device 13. Film editing software is loaded from computer media or downloaded through the Internet, then executes and first presents the top menu screen shown in FIG. 2. On this screen 20 the user is presented with the three phases of editing a film or video: selecting clips, represented by the film camera 21, editing clips into a project or reel, represented by the film reel 22, and the presentation of the video, represented by the film projector 23. Each item on the screen is a three-dimensional model which is animated and projected in a perspective view onto the screen 20. Each item rotates and zooms into view when touched by the user with the touch screen, or when clicked with the mouse, or commanded by spoken word such as "camera." The representations of film equipment, or film analogues, enlarge when touched and reveal additional information and choices to the user.

In the preferred embodiment of the invention, the 3D animation of the user interface is accomplished with a computer program written in C++ and using the OpenGL 3D graphics library. The OpenGL library is supported on a number of different platforms including Microsoft Windows, Apple OSX, Apple iOS, Google Android and other operating systems. The OpenGL library communicates to the 3D graphics chip on the computer system or mobile device through the OpenGL drivers supplied by the manufacturer of the chip, to affect the drawing and animation of the objects on screen.

In the preferred embodiment of the invention, the objects are drawn as solid objects with shading and texture. It should be understood that the display may also be a stereo projection or another type of 3D viewing system, the invention is not limited to a flat projection of 3D objects. 3D graphics systems with texturing are well known, first being used in flight simulators as taught in U.S. Pat. No. 4,615,013 "Method and Apparatus for Texture Generation" by Johnson K. Yan, et al. (1986).

The built-in 3D graphics chip draws the objects from endpoints, surface normal vectors, textures, rotation matrices, projection matrices and lighting parameters defined by the software and transmitted by the central processor of the computer or mobile device to the graphics chip. The graphics chip can receive the object information and draw the objects without further burdening of the central processor. However, if there is a speed or performance limitation of the system, the drawing of the objects may exclude texturing, shading, or surfaces, or any combination thereof, or the system may draw the objects as wireframes, or outlines, or not animate the objects unless selected, in order to reduce the computational load on the computer processor or graphics chip. The invention is not limited to the realistic drawing of the objects.

Figure 3:
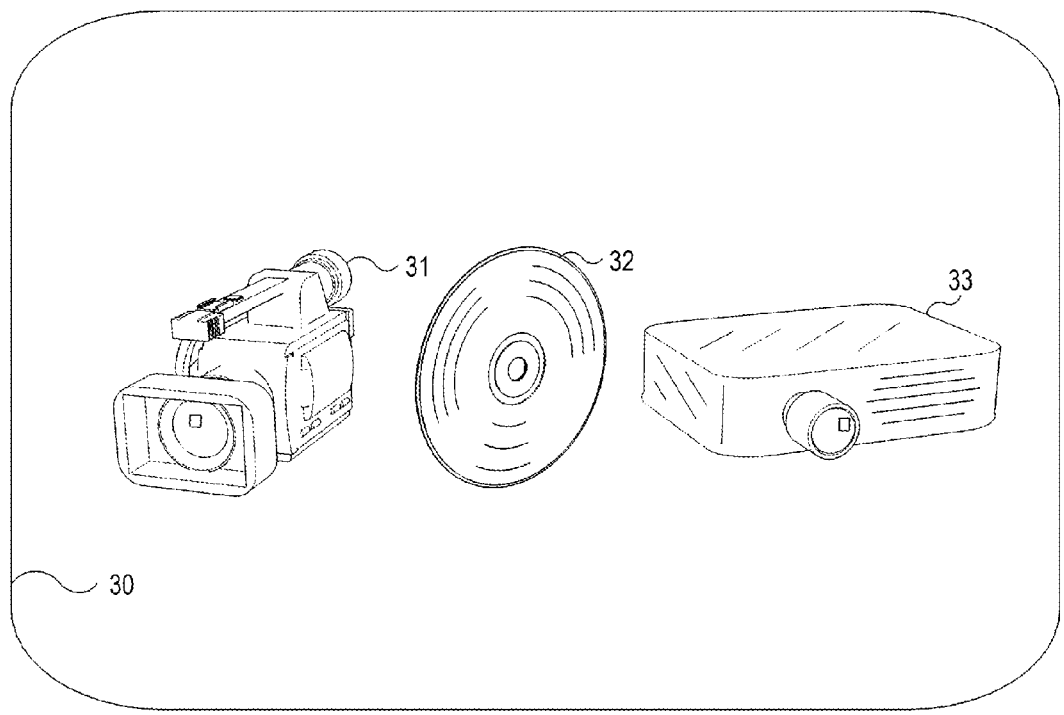
FIG. 3 shows an alternate style top level menu screen with video camera, optical disk, and video projector.

In FIG. 3, an alternative top menu screen 30 can also be presented to the user with a virtual video camera 31, optical video disk 32, and a video projector 33. In a similar method to the screen of FIG. 3, selecting clips is represented by the video camera 31, editing clips is represented by the optical disk 32, and the presentation of the video is represented by the video projector 33.

Figure 2:
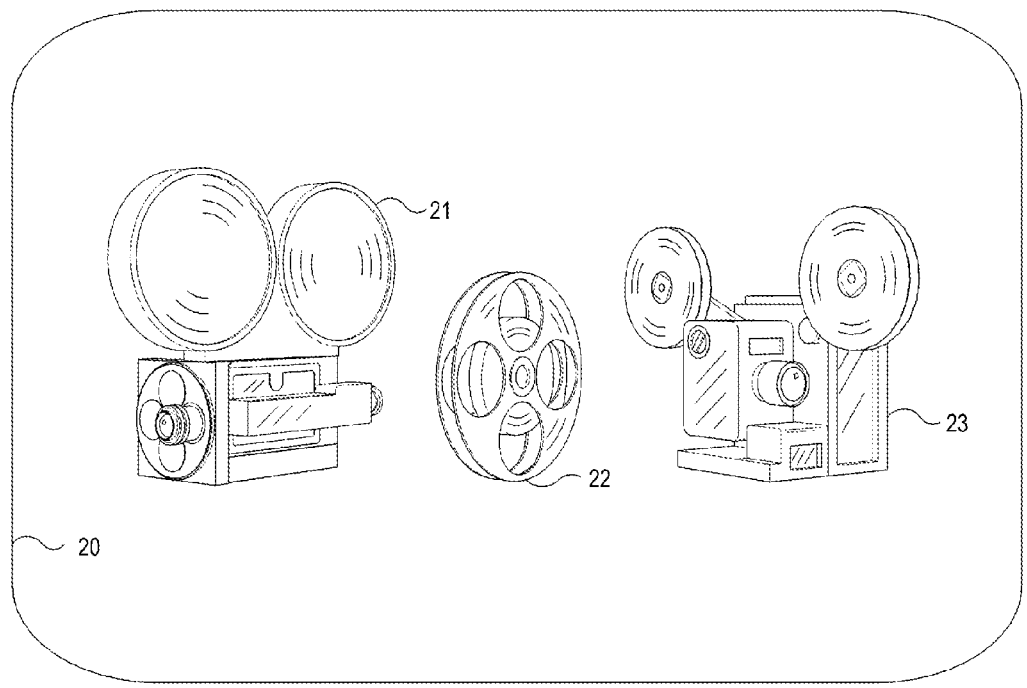
FIG. 2 shows the top level menu screen with film camera, reel, and film projector

Using either the film or video equipment analogues allow the user to select the desired phase of video editing, and in the present invention the two sets of objects shown in FIG. 2 and FIG. 3 are equivalent. It should also be understood that the invention is not limited to these objects, but to any appropriate depiction of film or video equipment with which a user of the system may be familiar.

Figure 4:
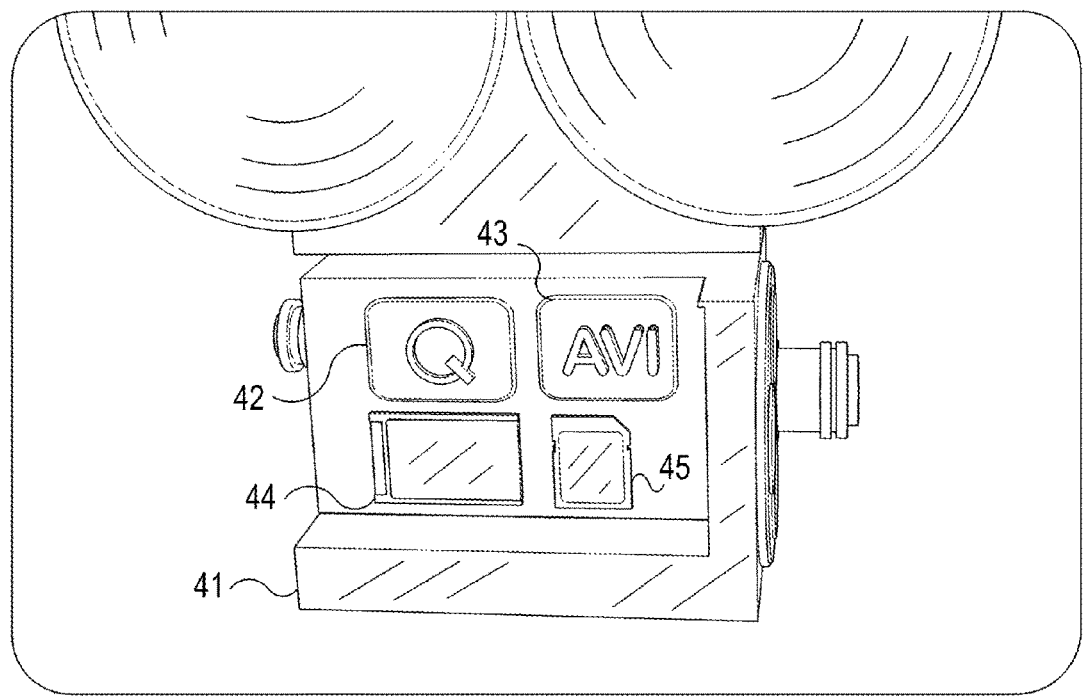
FIG. 4 shows the back of the camera with file format containers shown.
Figure 5:
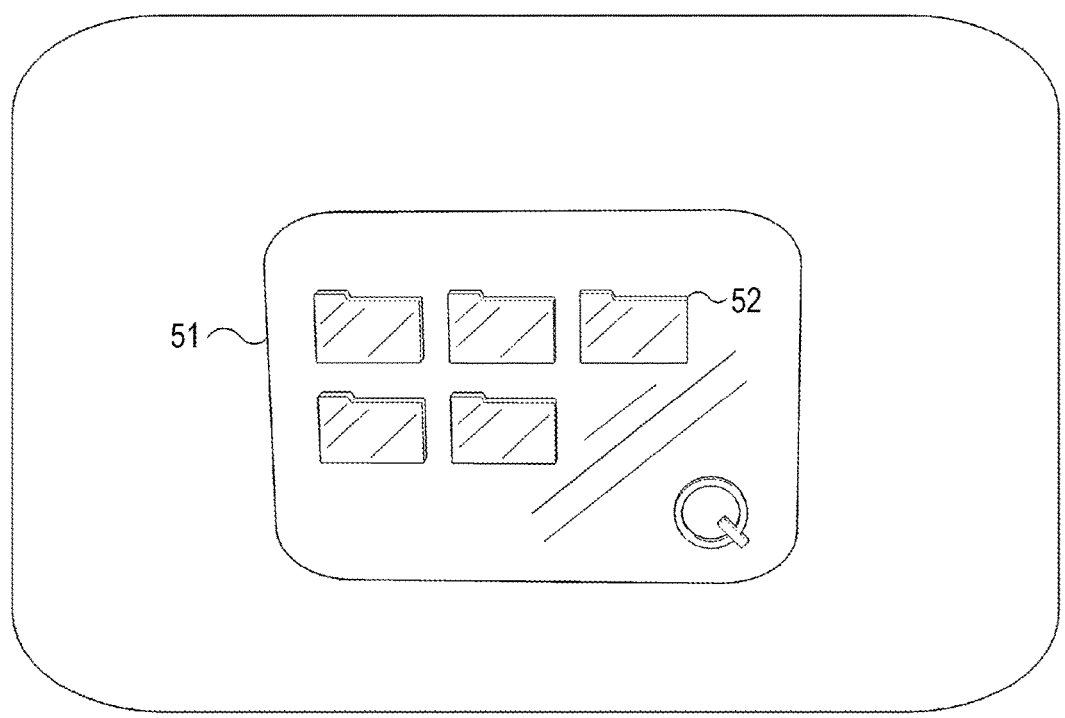
FIG. 5 shows the back of one file format container with folders.
Figure 6:
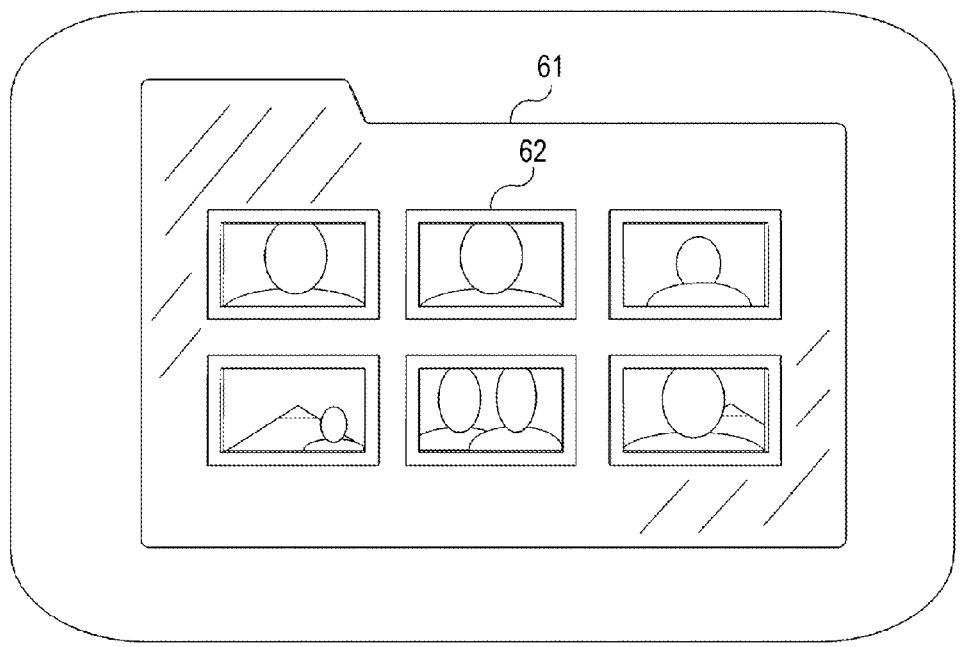
FIG. 6 shows the back of one folder containing virtual film clips.

For the selection of clips in FIG. 2, the user clicks or touches the camera 21. The camera rotates into a close up view, revealing the supported file formats for selection by the user, as shown in FIG. 4. In FIG. 4 the back side of the camera 41 reveals the QuickTime™ 42 and AVI file formats 43, and two memory card formats: the P2 format 44 and the SD format 45. It should be understood that these are examples and the invention is not limited to these formats. The formats are represented by virtual containers such as the 3D graphical image of a solid box or panel with an appropriate legend. In the case of a memory card format the container is designed to look like the actual card. The user touches, speaks, or clicks on the format that is to be edited. Referring to FIG. 5, the container 51 for the particular format rotates, enlarges, and reveals all the folders or memory cards 52 on the computer system that use that particular format. In this way the software helps the user quickly locate the clips and only shows the folders of clips that are of interest to the user. Files and folders that are unrelated to video or audio editing are hidden and thus do not clutter the screen. This is an improvement over the existing state of the art in which desktop file system dialogs are used to locate clips. Desktop file systems dialogs are taught in U.S. Pat. No. 4,939,507 "Virtual and emulated objects for use in the user interface of a display screen of a display processor" by Marian H. Beard, et al. (1988). Desktop file system dialogs are too cluttered and too complex to be used effectively with either touch screen systems or voice recognition video editing systems, because they are not selective enough. In the present invention, only folders containing clips of interest are shown to the user, and that is a great improvement over the state of the art for desktop computer-based video editing systems. The user clicks, touches, or speaks the name of the desired folder in FIG. 5 and the folder rotates and enlarges to reveal the full view in FIG. 6. FIG. 6 shows one such folder 61 with virtual film clips 62. The user then clicks, touches, or speaks the name of the desired clip that is to be edited into the project. The clip enlarges to reveal virtual controls for the editing of the clip FIG. 7.

Figure 7:
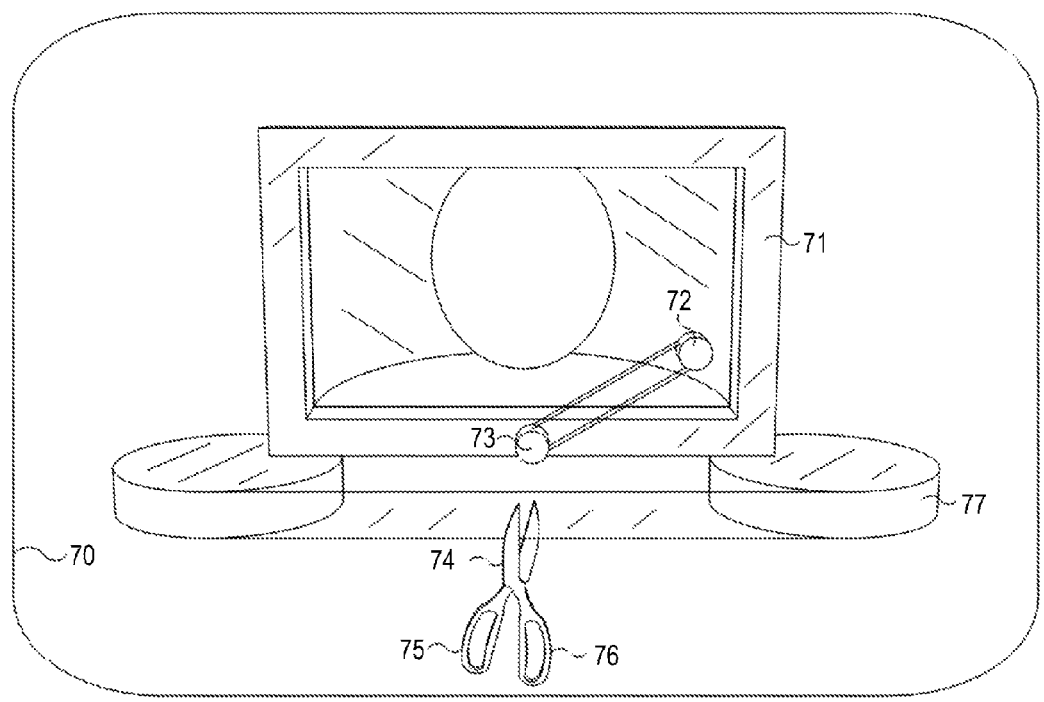
FIG. 7 shows the virtual film viewer and virtual film strip, crank handle, and scissors.

Turning now to FIG. 7, on the system display screen 70 the virtual viewer 71 initially displays the first frame of the clip. To edit the clip, the user touches or clicks on the playback control which is a virtual button or knob 73 underneath the viewer screen, and drags out a virtual crank 72. The crank simulates the action of a mechanical crank arm. The crank can both be turned and lengthened or shortened at the same time. The angle of the crank advances or retards the frame. The length of the crank determines the number of frames per turn of the crank that the film is advanced or retarded. In this way the user has both coarse and precise control over the playback position of the clip. Bringing the crank outward allows more precise control, bringing the crank inwards allows more range so the user can slew the playback position quickly from beginning to end. This control operates more intuitively than conventional video editing controls, and allows better control without multiple clicks or touching of the screen. In the preferred embodiment the crank control originates underneath the screen, and has a semi-transparent handle so it does not obscure the video when crossing in front of it. The present invention also includes an alternate method as follows: one direction of travel of the crank's endpoint, for example, left to right, controls the frame advance or retard, and the other direction of travel, for example, up and down, changes the coarseness of the control. Either method, or an alteration of these methods which would be trivial to someone skilled in the art, is within the scope of the present invention.

The present invention is a great improvement over the existing state of the art. Methods of indexing through motion video are taught in U.S. Pat. No. 6,597,375 "User interface for video editing" by Mitchell A. Yawitz et al., (2003) wherein a pair of sliders are used to index through a video clip to select the in- and out-points; or in U.S. Pat. No. 7,844,901 "Circular timeline for video trimming" by Jose Joseph (2010) wherein a single rotation of the finger advances the clip position from beginning to end of the clip, or in US Patent Application No. 20110310007 "Item navigation using motion-capture data" by Jeffrey Margolis et al. (Filed 2011), wherein rotational movement of a person's arm is sensed by a motion capture system to scroll through a menu. None of this art permits both very precise control and rapid indexing through an entire clip of motion video with a single control. In US Pat Application 20130307792 "Gesture touch inputs for controlling video on a touchscreen" by Isaac Andres and Jeremy Walker (Filed 2013), wherein one-dimensional movement of the finger is analyzed for speed of motion to move the video pointer as if it were a heavy object with momentum, it is possible to index through an entire clip, however it requires both getting the virtual heavy object started and then stopping its momentum again at the desired point. The present invention is a great improvement over that, as it requires less work to rapidly index through the video clip.

In another aspect of the invention, the playback control 73 can also be operated by voice command with words such as "play," "reverse," "stop," "fast forward," "rewind", "slow down" and "speed up." It should be understood that the command words may be different, or in a different language, and still be within the scope of the invention.

The video clip can be shortened before the clip is dropped into an edited sequence of shots. In film parlance, this is known as trimming. The user accomplishes this by using actions that are analogous to editing motion picture film. After changing the playback position of the clip using the crank arm 72, the user then clicks or touches the virtual scissors 74 to make the head cut to the virtual film 77. Changing the playback position and clicking or touching the scissors again affects the end cut. When the virtual film 77 is cut, or trimmed in this manner the discarded portion of the cut appears transparent or invisible. However the user may still view the trimmed-off portions of the cut. The cuts may be moved by clicking either the left-hand handle 75 or the right-hand handle 76 of the scissors to change the head or tail of the cut, respectively. In an alternate method, there are two pairs of scissors, one above the strip of film and one below the strip of film. The scissors above, when touched, changes the head cut. The scissors below the film changes the tail cut. Either method, or an alteration of these methods which would be trivial to someone skilled in the art, is within the scope of the present invention.

The user may also change, using other controls, the color balance of the clip, or the repositioning of the frame or other video effects, or the superimposition of titles, or the transition type used for the motion video (hard cut, lap dissolve, wipe, or other transition), or the audio track head and tail cuts, or the audio volume, or the audio transition, or the audio effects. In each case the controls operate much like the controls on a mechanical film viewer or other piece of film or audio equipment, and the user relies upon the crank arm to position the shot before taking an action. Other cranks arms may appear on the screen to affect other parameters. It should be understood that the type and number of controls may be increased or varied and the result would still be within the scope of the invention.

Figure 8:
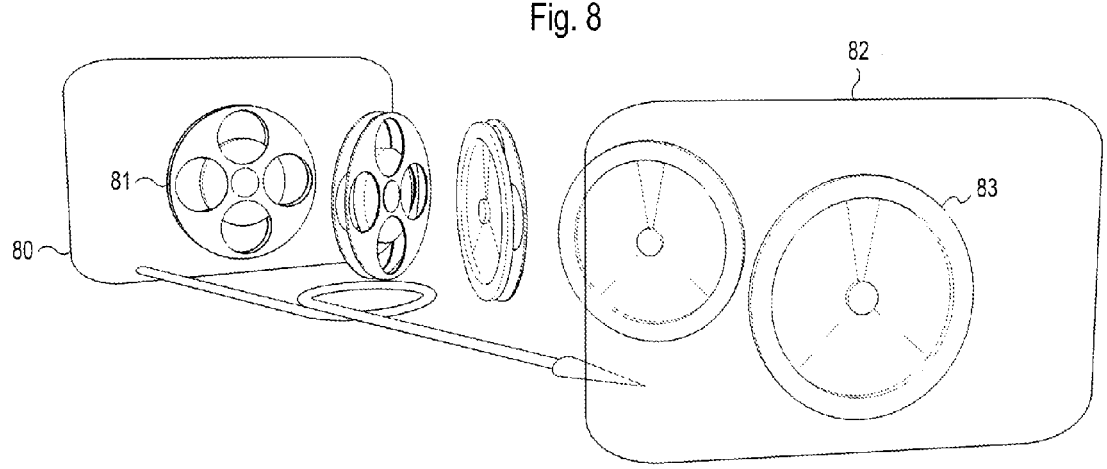
FIG. 8 shows the virtual film reel which animates and turns to reveal the pie chart.

Turning back now to FIG. 2, to assemble the clips into a scene the user clicks or touches the film reel 22. The film reel rotates and enlarges as shown in FIG. 8 to reveal the clips in the project represented as a pie chart. Referring to FIG. 8, the first screen 80 shows a projected view of the reel 81. FIG. 8 then shows the animation of the reel as the animation progresses in time from left to right. The reel rotates and comes forward, revealing in the final screen 82, the pie chart 83. The exact method of revealing the chart may be varied and still be within the scope of the invention, for example the film reel may be replaced with the optical disk 32 shown in FIG. 3.

Figure 9:
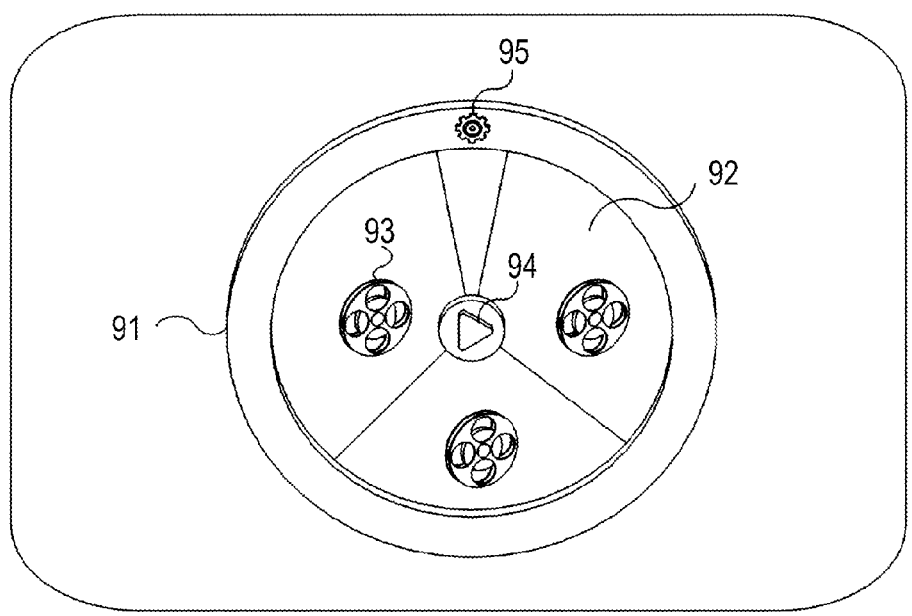
FIG. 9 shows the detail view of the pie chart with gear control, and sub-reels.

Turning to FIG. 9, there is shown a close-up view of the pie chart 91 which represents the content of the reel. The reel always begins and ends with black leader which is represented by the narrow section. The first shot of the reel is the pie section 92. The third shot contains a sub-reel 93. The sub reel is an edited scene which plays back in place of the third shot, or superimposed over it. This sub-reel, when touched or clicked by the user, turns and opens in a manner similar to FIG. 8 to show the contents of the sub-reel. Clicking the rim of the reel returns the user to a view of the parent reel. The user can thus move through the hierarchy of reels and sub-reels in a similar manner to moving up and down the branches of a tree. In the present invention the number of levels in the hierarchy is unlimited. This pie chart method has two advantages over the timeline that is used in the present state of the art video editing system. First, the pie chart, containing sub-reels (FIG. 9) shows the cyclical and hierarchical nature of narrative films, shorts, commercials, and documentaries. For example, many films begin and end the same way, with titles or credits. Also, many scenes in a narrative film begin and end with wide shots, also known as establishing shots. Also, it is true that within many films, the shots in a scene typically use a consistent type of transition. For example in a fight sequence or car chase, hard cuts are used between every shot. In a "montage", which is a slower-paced sequence of shots that is often edited to music, the transitions may all be lap dissolves. To facilitate this common style of editing in the present invention, each scene is edited in a separate reel, and each reel uses a default transition that is defined for that reel. The default transition is used consistently throughout the reel, unless overridden by the user. The type and timing of all the transitions in the reel may be changed in a single operation by clicking the gear icon 95 on the top of the reel. This change will affect all the transitions in the reel, and any sub-reels, unless they already have defined default transitions. This is a more economical way of changing transitions within a scene as compared to the present state of the art of the timeline, wherein there is no simple logical grouping or hierarchy of transitions.

The hierarchical nature of films is represented by using sub-reels in the current invention. Films are hierarchical because a film is composed of reels, or a television show is composed of acts. The reels or acts of the film are in turn composed of scenes. The scenes are in turn composed of shots. Thus a large and complicated project may be broken down and edited scene by scene, often with the same transitions consistently used between each shot. In the present invention this is represented by a reel, or sub-reel. The sub-reels are then assembled, again with consistent transitions, into a group of scenes such as the first act of a television drama.

With a single touch to the screen, all the transitions in a scene may be changed. Or all the transitions between the scenes may be changed. This is a logical and intuitive way to assemble and edit a large project wherein a hierarchical structure allows the user to make multiple changes with a few touches, or voice commands, whereas in the timeline, which is the previous state of the art, a large number of operations would be required to change all the transitions between the cuts of a scene, or between the scenes of a reel, for example.

Of course, the present invention allows the user to individually control each transition and cut, but if the cyclical and hierarchical features of the present invention are employed to their full extent, the work of editing or re-editing the video is greatly reduced. The current state of the art video editing system, as taught in U.S. Pat. No. 6,469,711 titled "Graphical User Interface for a Video Editing System" by Kevin J. Foreman et al (2002) does not allow for the cyclical and hierarchical representation in a way that is easy to see and understand; the current invention is a great improvement over that. Also the "storyboard" method of editing films as has been taught as for example in U.S. Pat. No. 4,538,188 "Video composition method and apparatus" by Ronald C. Barker and Chester L. Schuler (1985), wherein a still image taken from each clip is used to select or navigate through the timeline, and U.S. Pat. No. 5,442,744 "Methods and apparatus for displaying and editing multimedia information" by Trevor Morris and Michael Piech, (1995) wherein the story boards are arranged in a tree-like structure representing a hierarchy of scenes and shots. However the methods described in this prior art do not allow for an easy way to navigate through the storyboards, or through the hierarchy. The improved method of the present invention allows this by using 3D objects as nested containers, responsive to the touch of the user or to spoken command. This method of using nested 3D objects to show hierarchy is more readily grasped by the user than the methods used in the prior art.

In the present invention, after a scene is assembled, it is necessary to adjust the timing of the scene. In the present invention, this is accomplished with a synchronizer. In the film world, the synchronizer is a mechanical device in which multiple strips of film or audio are loaded together in a series of sprockets that are ganged together, and they keep each strip of film synchronized when the sprockets are turned. The synchronizer is represented virtually in the invention. It appears the same as the virtual viewer in FIG. 6, but has multiple rolls and strips of film beneath it. Any shot, reel or sub-reel may be loaded by the user into the synchronizer and the relative timing of each shot with respect to other shots or the audio tracks may be examined and adjusted. Also if the video contains superimposed shots or titles, these may be adjusted relative to the other shots as well, by using the synchronizer.

Figure 10:
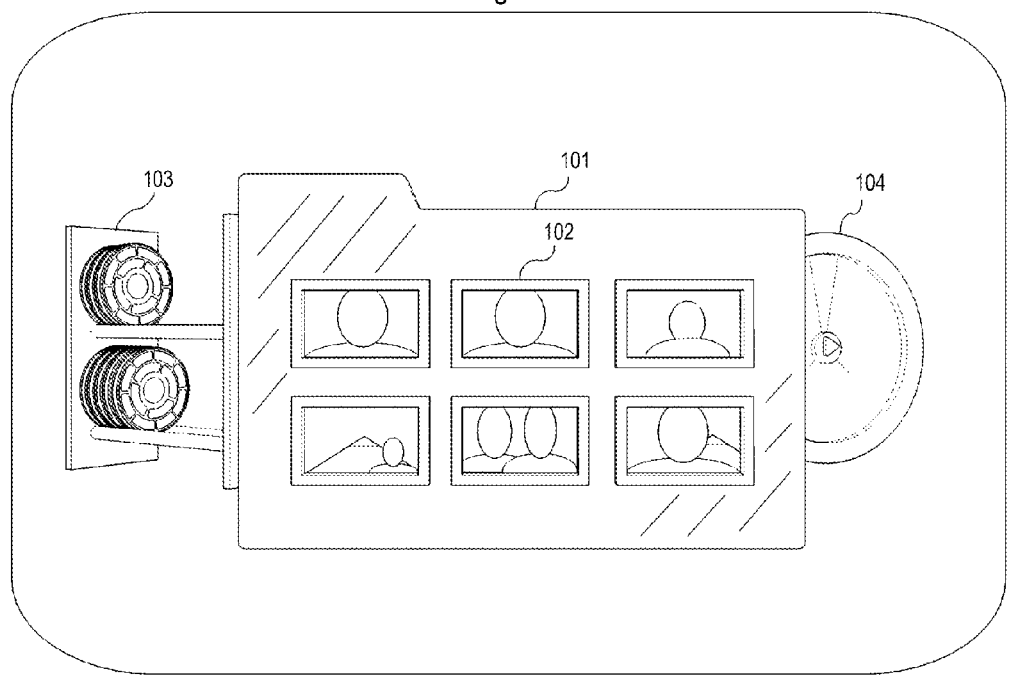
FIG. 10 shows the folder with virtual film clips and two destinations, the shelf and the reel.

Adding a shot to an existing reel is accomplished by either using the multiple clip view (FIG. 5) or the virtual viewer (FIG. 6), wherein the user drags the clip into the project represented by the film reel. One embodiment of this aspect of the invention is shown in FIG. 10. Using a touchscreen, the user employs a gesture, where the finger strokes across the clip 102 contained in the folder 101, and directs it either into a clip library 103 or to the end of the reel 104. The direction of the gesture indicates which destination is intended. Throughout the invention, a gesture is used to direct the flow of clips through the project without the user having to drag and drop the clip from its source to its destination. This is an improvement over the state of the art, wherein a mouse is used to drag clips from their source to their destination in the timeline. The invention is also an improvement over a cut-and-paste operation which would require many extra touches of the screen.

Figure 11:
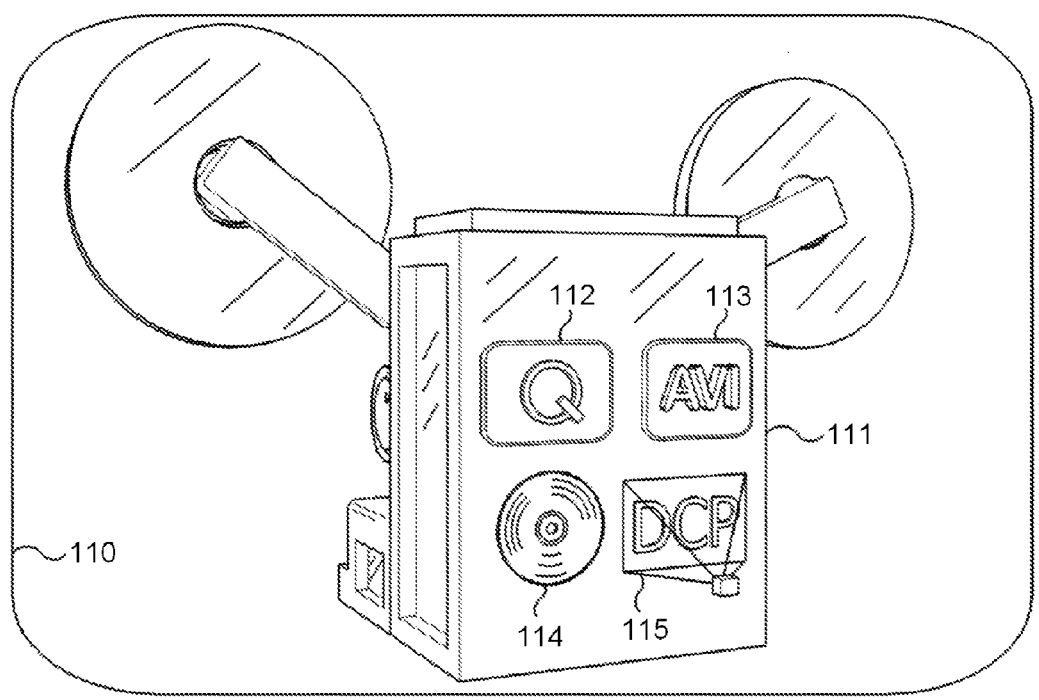
FIG. 11 shows the back of the projector with virtual file format selections for export of files for presentation.

The final phase of editing is exporting the video to a special file format for presentation to an audience. In the present invention, the user clicks or touches the film projector 23 in FIG. 2, or a video projector 33 in FIG. 3. The projector turns and enlarges to show the file formats available, FIG. 11. By touching the screen 110, or by spoken command, the user selects one of the export file formats on the back of the projector 111. Examples shown of output formats are: Quicktime™ 112, AVI 113, DVD™ 114, and Digital Cinema Package 115. Once the format is chosen, the user selects the destination folder. A plurality of controls then appears to set the various options for the exporting of the project.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A video editing system comprising:
   either a desktop computer, laptop computer or a mobile device, having a display screen and at least one user input device selected from a group consisting of a touch screen, a mouse, and a microphone;
      wherein virtual equipment appears on the display screen, created by a software program as a projection of a three-dimensional model of motion picture or video editing equipment which can turn or enlarge;
      wherein the virtual equipment is controlled by the user of the system by touching the display screen, clicking with a mouse, or commanding by voice, to edit motion video in a similar manner as real film equipment is used to edit strips of film or magnetic tape;
      wherein one or more virtual data containers appear to be within or nearby the virtual equipment, wherein the virtual data containers are defined as at least one of a group consisting of film clips, which represent motion video clips, and reels of film, which represent edited motion picture scenes, and folders, which represent a collection of motion video clips, and file format containers, which represent a type of file format, and other objects which represent other storytelling elements;
      wherein the user of the system may open these virtual data containers by touching the display screen, clicking with a mouse, or commanding by voice to turn or enlarge the data container to reveal virtual controls;
      wherein the virtual controls, which are attached to and associated with each virtual data container, are operated by the user of the system by touching the display screen, clicking with a mouse, or commanding by voice, to control the virtual equipment to play back the video, to change the video, or to export the video to another format, or to otherwise change the video, audio, or other data represented by each virtual data container;
      wherein the virtual controls which are attached to and associated with each virtual data container, are operated by the user of the system by touching the display screen, clicking with a mouse, or commanding by voice, to control the point in time at which the motion video or digital audio is to play back, which control is known as synchronization.

2. The system of claim 1, wherein a plurality of virtual equipment is used to represent the phases of video editing: the first phase which is selecting clips, the second phase which is assembling and adjusting the synchronization of clips, and the third phase which is to export the assembled clips to another video format for presentation to an audience;
   wherein the user of the system begins one of the phases of video editing by touching the display screen, clicking with a mouse, or commanding by voice, causing one of the virtual equipment to turn or enlarge to reveal the virtual data containers used for that phase of video editing.

3. The system of claim 1, wherein clips of motion video are selected for editing by using at least one of a group consisting of a virtual camera container, a virtual file format container, and a virtual folder; wherein the virtual folders contain virtual film clips representing clips of motion video or digital audio;
   wherein the virtual file format container, when selected, directs the system to restrict the search for virtual film clips to only that file format which is selected;
   wherein the virtual folders that appear to be contained in the virtual file format container are only the ones that contain files of the file format selected, and wherein the virtual folders, when selected by the user, appear to contain only the files of the file format selected.

4. The system of claim 1, wherein the virtual film clips can be enlarged to reveal a viewer with an attached virtual crank arm, that can be manipulated with a user input device, which is at least one of a group consisting of a mouse, a touch screen, and a microphone;
   wherein the virtual crank arm can be moved in both a radial and circular direction, independently;
   wherein motion of the virtual crank arm in the radial direction determines the sensitivity factor of the virtual crank arm, defined as the number of frames that are advanced or retarded per unit of movement in the circular direction, and movement in the circular direction advances or retards the video frame that is being displayed on the virtual film viewer, by an amount of frames multiplied by the sensitivity factor, allowing the user of the system both fine and coarse control over the frame being displayed;
   wherein upon changing the frame being viewed, the user may then operate a control to affect the head and tail cut to the clip, or operate a control to affect the color balance, effects, audio, or any other aspect of the video clip.

5. The system of claim 1 wherein the synchronization of motion video and digital audio is determined by using a virtual film synchronizer, wherein the virtual film synchronizer holds a plurality of virtual film strips representing motion video clips, or virtual magnetic tape containing digital audio, or stills, titles, or other storytelling elements which are played back in synchronization, with virtual controls attached to the film strips or magnetic tape for the synchronization of the motion video, digital audio and other storytelling elements, allowing the user of the system to adjust precisely when each motion video or digital audio file is to begin playback.

6. A video editing system comprising:
   either a desktop computer, laptop computer or a mobile device, having a display screen and at least one user input device selected from a group consisting of a touch screen, a mouse, and a microphone;
      wherein virtual equipment appears on the display screen, created by a software program as a projection of a three-dimensional model of motion picture or video editing equipment;
      wherein edited motion video is represented on the screen by at least one virtual container selected from a group consisting of a film reel, an optical video disk, and other media container; wherein the virtual container enlarges or turns when selected by the user to reveal the clips or scenes of the motion video organized in the form of a pie chart;
      wherein the top segment of the pie chart represents both the beginning and end of the clip or scene;
      wherein virtual controls, which are attached to and associated with each container, are operated by the user of the system by touching the display screen, clicking with a mouse, or commanding by voice, to control the virtual equipment to play back, edit, or otherwise change the video, audio, or other data represented by each container.

7. The system of claim 6 wherein the chart contains other virtual containers, each of which will enlarge or turn when selected, revealing charts of more clips or scenes contained therein, and more containers nested therein if necessary, repeated to as many levels deep as necessary for the user of the system to represent a hierarchical organization of the video;
   wherein each level of the hierarchy, as represented by the virtual container, has its own set of virtual controls that are attached to and associated with that level.

8. The system of claim 6 wherein the chart contains nested virtual containers, in a hierarchical organization of the video, each of which represents more clips or scenes in a lower level hierarchy contained therein; wherein a virtual control on the nested virtual container is used to change the transitions between each clip or scene in the container, but only the transitions which are at that same level of the hierarchy;
   wherein each of the transitions has a default setting, and each default setting is determined by the default setting at the next higher level of the hierarchy.

9. The system of claim 6 wherein a gesture by the user, including a flick or swipe of the finger, is used to move clips from a virtual container of unedited clips to a virtual film reel container, or a virtual optical disk container, or a virtual library shelf, or other container, to facilitate the building of a sequence of clips for the edited motion video; wherein only the direction of the gesture determines into which virtual container the clip is to be placed.

10. A video editing system comprising:
    either a desktop computer, laptop computer or a mobile device, having a display screen and at least one user input device selected from a group consisting of a touch screen, a mouse, and a microphone;
    wherein virtual equipment appears on the display screen, created by a software program as a projection of a three-dimensional model of motion picture or video editing equipment;
    wherein the conversion of the edited motion video to another format, for purposes of showing to an audience, which is also called export of the motion video, is represented by a virtual film projector or video projector, and when the projector is selected by the user, by either touching the screen, or with the click of a mouse, or by spoken command, the projector turns or enlarges to reveal a plurality of file format containers, which represent different file formats;
    wherein the file format containers, when selected by the user, enlarge to reveal virtual controls which are attached to and associated with each file format container, to control export of the motion video to the selected file format; and also to reveal virtual folders, which represent a file path, to be selected by the user for the storage of the files created by the export of the motion video.

* * * * *